April 20, 1954   R. D. TRACEY   2,676,034
DEVICE TO CONNECT TWO VEHICLES
Filed Jan. 21, 1952   2 Sheets-Sheet 1
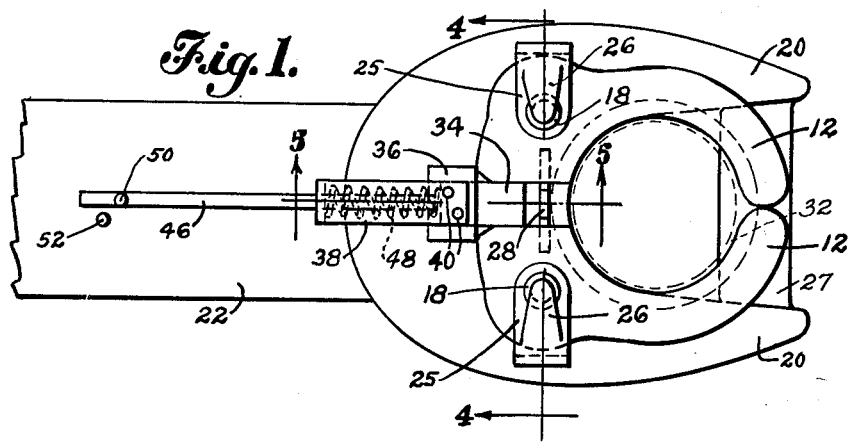
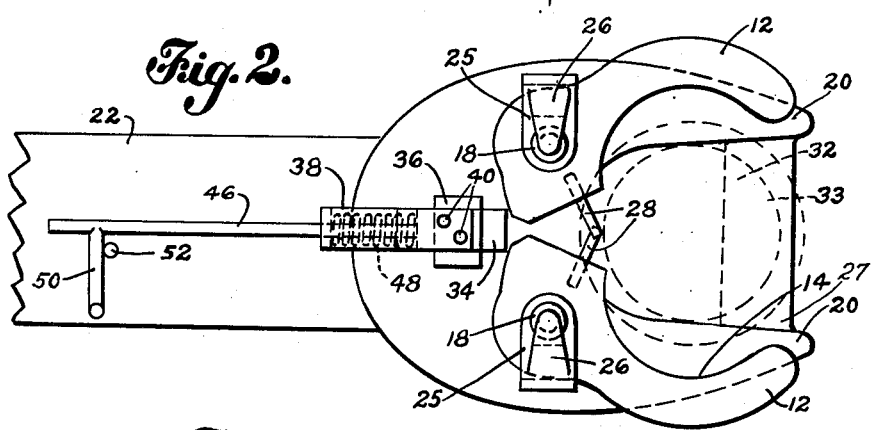
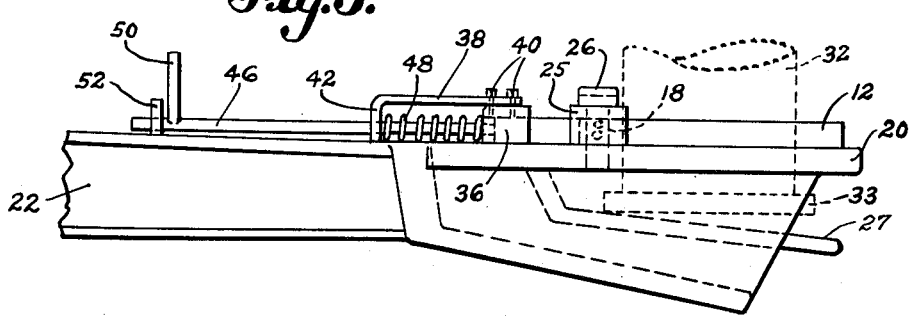
INVENTOR.
Richard D. Tracey
BY Harold E. Cole
Attorney April 20, 1954   R. D. TRACEY   2,676,034
DEVICE TO CONNECT TWO VEHICLES
Filed Jan. 21, 1952   2 Sheets-Sheet 2
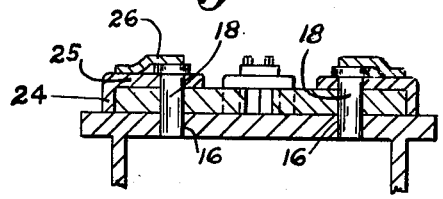
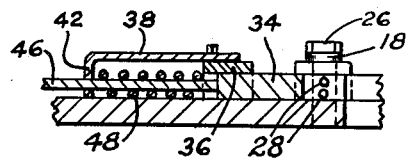
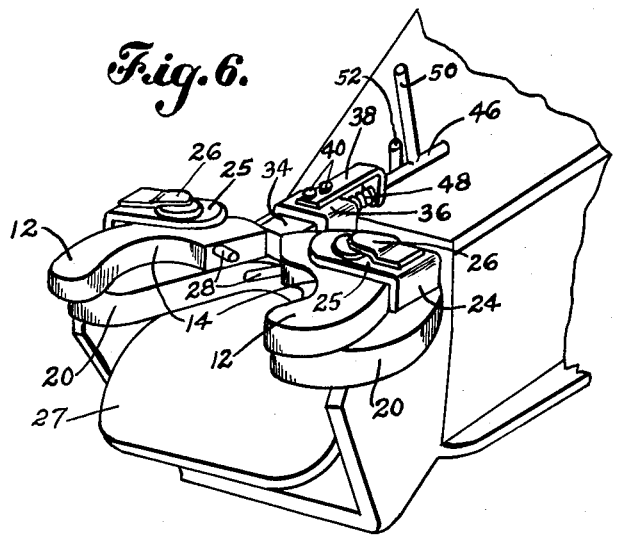
INVENTOR.
Richard D. Tracey
BY Harold E. Cole
Attorney Patented Apr. 20, 1954

2,676,034

UNITED STATES PATENT OFFICE 2,676,034

DEVICE TO CONNECT TWO VEHICLES

Richard D. Tracey, Lexington, Mass.

Application January 21, 1952, Serial No. 267,415

2 Claims. (Cl. 280—508)

This invention relates to a device to connect two vehicles or conveyances, such as a trailer to a truck or other pulling apparatus.

One object of my invention is to provide such a connector device that is especially effective and certain when used in connected position, yet can readily be moved to connected or disconnected position by an easy and simple movement.

Another object is to make such a device that is relatively inexpensive to manufacture because the parts are simple in shape and easy to assemble.

The foregoing and other objects which will appear as the nature of the invention is better understood, may be accomplished by a construction combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

Figure 1 is a top plan view of my device in closed position, the trailer tongue attached thereto being shown broken away. Figure 2 is a similar view; but showing my device in open position. Figure 3 is a side elevational view of the same, in closed position.

Figure 4 is a sectional view taken on the line 4—4 of Figure 1, and Figure 5 is a sectional view taken on the line 5—5 of Figure 1.

Figure 6 is a perspective view of my device in open position, the trailer tongue attached thereto being shown broken away.

As illustrated, my connecting device has two locking jaws 12 preferably spaced laterally apart at their rear portions at all times, each of which has a recessed or concave surface at the front portion as at 14. At their rear each has a hole 16 extending downwardly therethrough whereby each said jaw 12 is pivotally connected by a pin 18 that extends therethrough and is fixedly set in a connecting portion of a conveyance, which includes, as shown, a forked extension portion 20 of a trailer tongue 22 or other connecting part of a trailer. I preferably use L-shaped members having leg portions 24 that may be welded or otherwise attached to said trailer extension portion 20, and from which legs 24 top portions 25 extend angularly. Said pivot pins 18 extend through the latter, being partly covered and retained by a cap 26 attached to each said top 25. Said leg portions 24 prevent any outward movement of said jaws 12 beyond a predetermined, normal, open position. Below said jaws 12 and forked portion 20, preferably is a downwardly and outwardly extending, guiding base 27 which is attached, as by welding, to said extension portion 20, and which serves as a guide for a connector member 32, later described, and keeps the latter from passing below a predetermined point.

Each said jaw 12 has an actuating member 28, shown as a pin, that extends laterally beyond the inner rear edge of a said jaw 12 towards the other jaw. In other words said pins 28 extend from said jaws 12, towards each other and when said jaws are in open position said pins are adjacent each other or may overlap a little. In any event a coupling or connector member 32, having an enlarged head 33, which is on a truck or pulling vehicle, is of greater thickness than any space between said actuating pins 28, consequently as said connector member 32 is moved against said pins 28, as by backing a truck towards them, said jaws are rotated towards each other to closed position shown in said Figure 1.

Once said jaws 12 are in closed position they are kept locked in place by a movable locking block 34 that normally positions itself in the space between said two jaws 12 at their rear portions, this preventing any outwardly, rotative movement by them towards open position.

This locking block 34 is slidable on said trailer tongue portion 20, being guided laterally in its movement by a U-shaped guide member 36 attached to said trailer tongue 22. An angular retaining strap consists of a leg 38 riveted as at 40 to said guide 36, and a stop portion 42 at an angle to said leg. This stop portion 42 has a hole extending therethrough, and through which a control rod 46 passes and through a coil spring 48, and is attached to said locking block 34. It extends rearwardly beyond said stop portion 42 and at the rearward portion has a locking handle 50 extending laterally therefrom. Said trailer tongue 22 has an upstanding catch member 52 attached thereto, against which said handle 50 is held when my device is locked in closed position.

To connect a trailer to a truck, for instance, the latter having said coupling pin 32 attached to it, which, upon movement of the truck, forcibly contacts said actuating members 28, thus movably rotating said locking jaws 12 together to closed position shown in said Figure 1. Said locking handle 50 is drawn away from said catch member 52, hence, said spring 48, which has been under compression, is freed, and it forces said locking block 34 into the space between rear portions of said jaws 12 thus preventing any movement from closed to open position of said jaws 12 while said locking block remains there. To move said jaws 12 to open position said control rod 46 is pulled rearwardly to thus draw said block 34 out of the space between said jaws 12 and thus to compress said spring 48. Said jaws are then free to be rotated to open position shown in said Figure 2, and said handle 50 may be moved to a position rearwardly of and against said catch member 52. In open position any space between said jaws 12 is preferably less than the width of said locking block 34.

What I claim is:

1. A device to connect two vehicles in combination with the connecting portion of a said vehicle, said device comprising two jaws pivotally attached to said connecting portion, the rear portions of said jaws being spaced apart when in closed position, said jaws having actuating members fixedly attached thereto adapted to cause pivotal movement of said jaws towards each other when pressure is applied to them, a movable locking block adapted to enter the said space between said jaws when in closed position, a guide member rearwardly of said jaws, attached to said vehicle connecting portion which guides the movement of said locking block, an angular, retaining strap attached to said guide member and embodying a stop portion having a hole therethrough, a coil spring between said block and stop portion, a control rod attached to said locking block and extending through said coil spring and stop portion hole and rearwardly thereof and adapted upon actuation to move said locking block out of said space between said jaws, and L-shaped members attached to said connecting portion and extending upwardly and embodying top portions extending partly over said jaws, said L-shaped members being so positioned that said jaws abut against them when moved to open position thereby limiting the movement of said jaws, and cap members attached to said L-shaped member top portions and extending over the pivoted portions of said jaws.

2. A device to connect two vehicles, one of said vehicles having a connecting member, said device comprising a connecting portion, two jaws embodying front portions having arcuate-shaped, inner surfaces and embodying rear portions having non-arcuate-shaped inner surfaces, pivot means pivotally attaching said rear portions to said connecting portion, said jaws embodying actuating pins extending from said rear portions diagonally forward into the path of said connecting member when said jaws are open, said pins overlapping each other when said jaws are closed, said pins being adapted to cause pivotal movement of said inner portions towards each other when pressure is applied to said pins by said connecting member, and means to prevent said jaws from involuntarily moving from closed to open position.

References Cited in the file of this patent

UNITED STATES PATENTS

| Number | Name | Date |
|---|---|---|
| 776,292 | Buller | Nov. 29, 1904 |
| 816,129 | Scouten | Mar. 27, 1906 |
| 820,383 | Ashland | May 15, 1906 |